(12) United States Patent
Macaraeg (10) Patent No.: US 7,325,978 B2
(45) Date of Patent: Feb. 5, 2008

(54) OPTICAL FIBER CONNECTOR APPARATUS AND METHODS

(75) Inventor: Peter Macaraeg, Fountain Hills, AZ (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 11/192,647

(22) Filed: Jul. 29, 2005

(65) Prior Publication Data

US 2007/0025664 A1 Feb. 1, 2007

(51) Int. Cl.
*G02B 6/38* (2006.01)
*G02B 6/36* (2006.01)

(52) U.S. Cl. .......................... 385/65; 385/62; 385/81; 385/83; 385/139

(58) Field of Classification Search ................ 385/62, 385/65, 81, 83, 139
See application file for complete search history.

(56) References Cited

U.S. PATENT DOCUMENTS

| | | | |
|---|---|---|---|
| 4,416,507 A * | 11/1983 | Hulin et al. .................. | 385/53 |
| 6,152,608 A | 11/2000 | Ghara et al. | |
| 6,379,053 B1 | 4/2002 | van Doorn | |
| 6,582,134 B2 | 6/2003 | Otera | |
| 6,609,835 B2 | 8/2003 | Trezza et al. | |
| 6,619,855 B2 | 9/2003 | Dudoff et al. | |
| 6,629,780 B2 | 10/2003 | Kang et al. | |
| 6,722,788 B2 | 4/2004 | Kang et al. | |
| 6,773,166 B2 | 8/2004 | Trezza et al. | |
| 6,814,498 B2 | 11/2004 | Kang et al. | |
| 6,814,499 B2 | 11/2004 | Finona | |
| 6,817,778 B2 | 11/2004 | Kang et al. | |
| 6,848,838 B2 | 2/2005 | Doss et al. | |
| 6,848,841 B2 | 2/2005 | Cochran et al. | |
| 6,899,465 B2 | 5/2005 | Trezza et al. | |
| 6,913,400 B2 | 7/2005 | O'Toole et al. | |
| 6,942,397 B2 | 9/2005 | Benzoni et al. | |
| 6,945,701 B2 | 9/2005 | Trezza et al. | |

* cited by examiner

*Primary Examiner*—Frank G. Font
*Assistant Examiner*—Derek L. Dupuis
(74) *Attorney, Agent, or Firm*—Lee & Hayes, PLLC (57) ABSTRACT

Optical fiber connection apparatus and methods are disclosed. In one embodiment, an apparatus for coupling a plurality of optical fibers includes a first and second registration blocks, each registration block including a body having a coupling surface formed at an end thereof, and a plurality of guides formed on an outer surface of the body, each guide adapted to receive an optical fiber with a terminal portion of the optical fiber positioned proximate the coupling surface. First and seconds retention members are disposed over the first and second registration blocks, respectively, the first and second retention members being coupleable to one another such that the coupling surfaces of the first and second registration blocks are engaged together and the plurality of guides of the first registration block are approximately aligned with the plurality of guides of the second registration block.

20 Claims, 7 Drawing Sheets

OPTICAL FIBER CONNECTOR APPARATUS AND METHODS

FIELD OF THE INVENTION

This invention relates generally to fiber optic cables and, more specifically, to apparatus and methods for connecting fiber optic cables.

BACKGROUND OF THE INVENTION

Breakthroughs in optical fiber have enabled the transmission of light across long distances without excessive attenuation by using the phenomenon of total internal reflection. Such breakthroughs have greatly increased the rate at which data can be transferred between computers and other devices. However, many challenges remain when dealing with optical fiber. Optical fibers often must be connected (or spliced) together to form longer fibers. However, connecting fibers often results in loss of signal strength at the connection.

To achieve total internal reflection, the light must pass through a path having an index of refraction higher than material surrounding the path. Light that is incident on the boundary between the path and the surrounding material will reflect off the boundary and remain trapped within the path, provided the light is incident on the boundary at a shallow angle.

Where two optical fibers are spliced, the potential for misalignment exists which can result in loss of signal strength. Light waves will be approximately perpendicular to the exposed ends of the optical paths formed by the optical fibers and will therefore not internally reflect at the ends. Where the end of one optical fiber is abutted against the exposed end of a second optical fiber, the light is transmitted into the second optical fiber. However, if the fibers are misaligned, the light striking the portion of the exposed end of the first optical fiber not abutting the end of the second optical fiber will be lost. Accordingly, the strength of the signal being transmitted through the second fiber is reduced.

Accordingly, it would be an advancement in the art to improve the alignment between spliced optical fibers in order to reduce signal attenuation.

SUMMARY

The present invention relates to systems and methods for connecting optical fibers, and more specifically, to systems and methods for connecting multiple optical fibers forming an optical cable. Embodiments of the present invention may advantageously improve the alignment between spliced or connected optical fibers, thereby reducing or eliminating signal attenuation.

In one embodiment, an apparatus for coupling a plurality of optical fibers includes a first registration block and a second registration block, each registration block including a body having a coupling surface formed at an end thereof, and a plurality of guides formed on an outer surface of the body, each guide adapted to receive an optical fiber with a terminal portion of the optical fiber positioned proximate the coupling surface. First and seconds retention members are disposed over the first and second registration blocks, respectively, the first and second retention members being coupleable to one another such that the coupling surfaces of the first and second registration blocks are engaged together and the plurality of guides of the first registration block are approximately aligned with the plurality of guides of the second registration block.

BRIEF DESCRIPTION OF THE DRAWINGS

Embodiments of the present invention are described in detail below with reference to the following drawings.

DETAILED DESCRIPTION

The present invention relates to systems and methods for connecting optical fibers. Many specific details of certain embodiments of the invention are set forth in the following description and in FIGS. 1 through 8 to provide a thorough understanding of such embodiments. One skilled in the art, however, will understand that the present invention may have additional embodiments, or that the present invention may be practiced without one or more of the details described in the following description.

Figure 1:
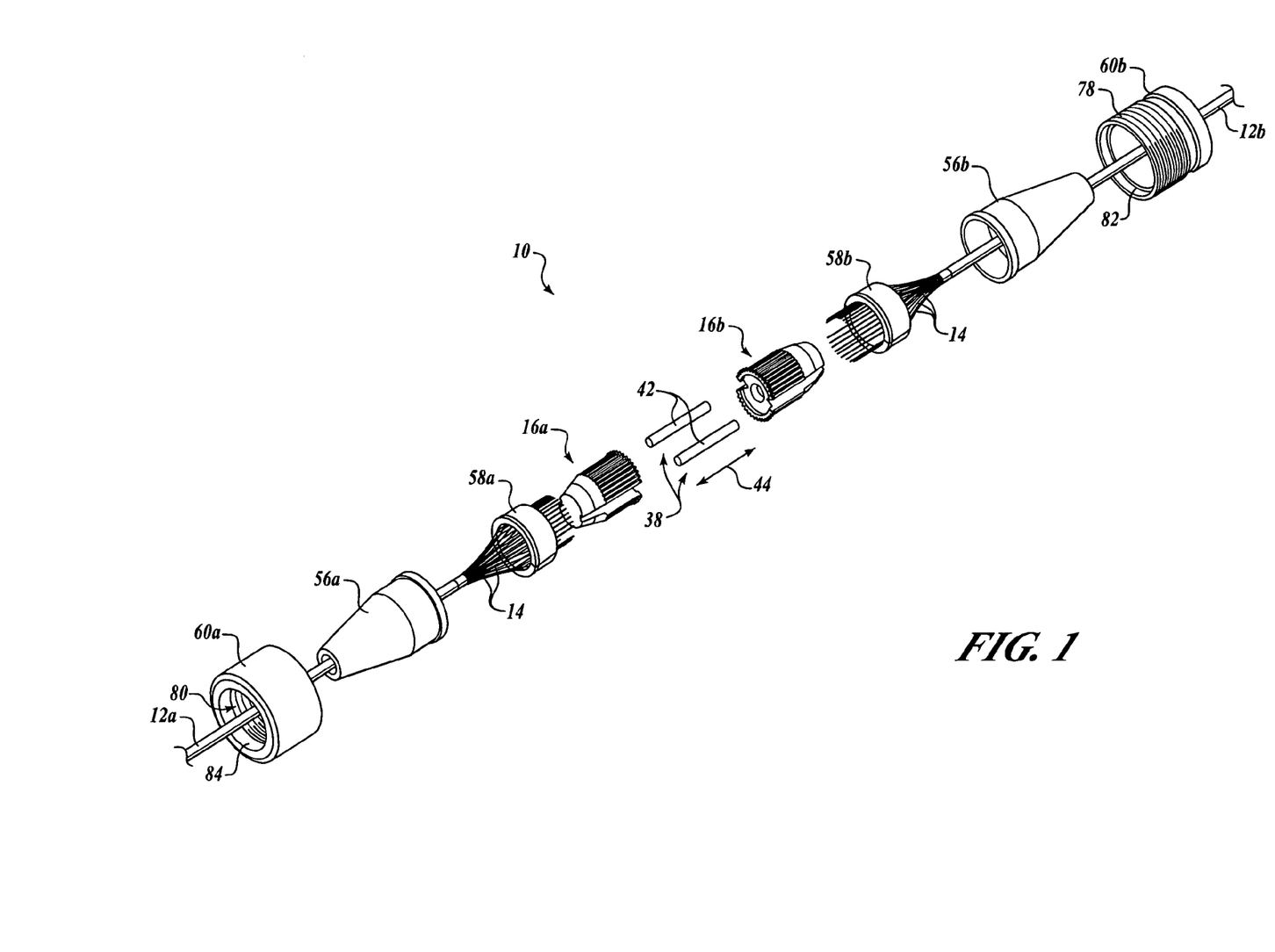
FIG. 1 is an exploded view of a connector assembly in accordance with an embodiment of the present invention.
Figure 2:
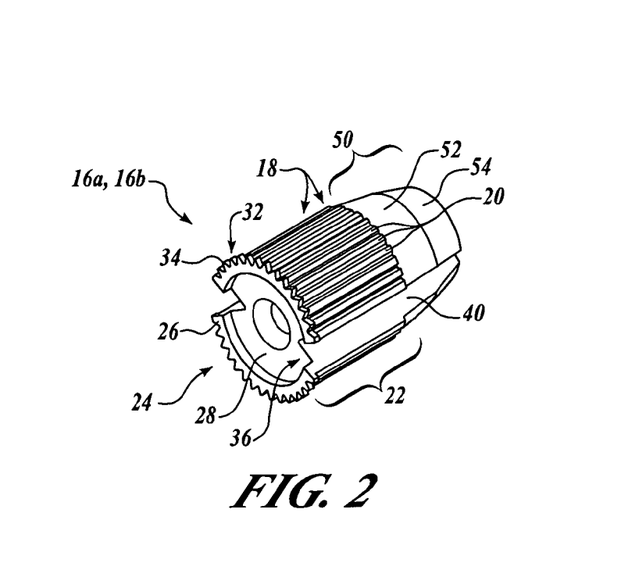
FIG. 2 is an enlarged, perspective view of a registration insert of the connector assembly of FIG. 1, in accordance with an embodiment of the present invention.

Referring to FIGS. 1 and 2, in one embodiment of the invention, a connector assembly 10 connects optical cables 12a, 12b, each including a plurality of optical fibers 14. The connector assembly 10 may serve to align the fibers 14 such that the end of each fiber 14 of the first optical cable 12a is precisely aligned with an associated end of a corresponding fiber 14 of the second optical cable 12b.

In the embodiment shown in FIGS. 1 and 2, the connector assembly 10 includes two registration inserts 16a, 16b each including a plurality of guides 18 sized to receive a fiber 14. The fiber 14 may be bonded to the guides 18 by means of adhesive or the like, or may be retained within the guides 18 by another structure. Alternatively, both adhesive and a retaining structure may be used. As best shown in FIG. 2, the guides 18 may be embodied as grooves 20, or alternately, as alignment pins, as apertures extending through the registration inserts 16a, 16b, or the like. In the illustrated embodiment, the grooves 20 are "V" grooves having angled walls joining at the bottom of the groove to form a "V" shape. Each guide 18 formed on the registration insert 16a may have a corresponding guide 18 formed on the other registration insert 16b, such that the registration inserts 16a, 16b may be joined having each guide 18 of the registration insert 16a aligned with a corresponding guide 18 of the other registration insert 16b. In the illustrated embodiment, the guides 18 are arranged symmetrically around a circle. For example, the guides 18 may be grooves 20 formed in a cylindrical portion 22 of the registration insert 16b.

A "V" shape and symmetrical arrangement of the guides 18 may promote precision of placement of the guides 18. Alternately, as mentioned above, small apertures or other structures may be used as guides 18 rather than grooves, however, it is believed that a "V" groove may be more readily machined than, for example, an extremely small through-hole suitable to receive a fiber as small as 100 microns. Furthermore, a "V" groove may be self registering, aligning the fiber at the center of the groove. Formation of the grooves 18 on the outside of the cylindrical registration inserts 16a, 16b may promote precision by enabling the registration inserts 16a, 16b to be mounted to a fixture and simply rotated about an axis relative to a fixed cutter, or like machine. Thus, movement about a single axis is required, reducing the opportunity for dimensional variation.

The registration inserts 16a, 16b may include a coupling face 24 formed such that the coupling face 24 of the registration insert 16a is matable with the coupling face 24 of the other registration insert 16b. In the illustrated embodiment, the coupling face 24 includes a planar engagement surface 26. The planar engagement surfaces 26 of the registration inserts 16a, 16b directly engage one another when the connector assembly 10 is completely assembled. The guides 18 may align the fibers 14 perpendicularly to the planar engagement surfaces 26.

As further shown in FIG. 2, the coupling face 24 may also include a fixture mount 28 sized to receive a fixture for holding the registration insert 16a, 16b while the ends of the fibers 14 are prepared for connection. The fibers 14 may be prepared by cutting, grinding, polishing, and the like. In the illustrated embodiment, the fixture mount 28 is a counter-bored hole inset from the engagement surface 26. In a particular embodiment, the counter-bored hole reduces the surface area or material of the registration insert in the area of the installed optical fiber faces to promote proper post-processing (e.g. grinding and polishing) of the installed optical fiber surfaces. In another particular embodiment, fixturing of the registration insert (e.g. subsequent to rough cutting of the installed optical fiber) for optical fiber grinding or polishing uses the alignment key receptacle 36.

The registration inserts 16a, 16b may include one or more stops 32 that project outwardly and that serve to engage other structures forming the connector assembly 10. As described more fully below, the one or more stops 32 may enable another structure to push or pull the registration inserts 16a, 16b toward one another to promote a good connection between the fibers 14. Pressing the fibers 14 of cable 12a against the fibers of cable 12b helps drive out air, which may interfere with the transmission of light. In the illustrated embodiment, the stop 32 is a flange 34 including a plurality of outwardly projecting, approximately triangular members that are distributed circumferentially about the registration insert 16a, 16b and formed flush with the planar engagement surface 26. In some embodiments, the guides 18, such as the grooves 20 extend through the flange 34.

The registration inserts 16a, 16b may further comprise one or more alignment key receptacles 36 (FIG. 2) each sized to receive an alignment key 38 (FIG. 1). The alignment key 38 may serve to align the registration inserts 16a, 16b with respect to one another such that the guides 18 thereof are aligned. A single alignment key 38 is positioned within alignment key receptacles 36 in both registration inserts 16a, 16b.

In the illustrated embodiment, the alignment key receptacle 36 is embodied by an alignment groove 40 formed in the registration insert 16a, 16b. The alignment groove 40 may be embodied as a "V" groove having angled walls joining at the bottom of the alignment groove 40 to form a "V" shape. The alignment grooves 40 may extend perpendicular to the engagement surface 26 and parallel to the fiber-receiving grooves 20. In the illustrated embodiment, each registration insert 16a, 16b includes two alignment grooves 40 symmetrically arranged on the registration insert 16a, 16b.

As shown in FIG. 1, the alignment key 38, or keys 38, may be embodied as a rod 42 having a wedge-shaped cross section sized to mate with the walls of the grooves 40. In the illustrated embodiment, the rod 42 is cylindrical. A cylindrical rod may provide the benefit of being manufacturable with great precision and being self aligning within the grooves 40. The rod 42 may have a length 44 sufficient to span both registration inserts 16a, 16b, or alternately, may only partially span the registration inserts 16a, 16b.

The alignment key receptacles may also serve to register the registration inserts 16a, 16b during manufacture. For example, alignment key receptacles may engage a fixture for holding and indexing the registration inserts 16a, 16b during a cutting operation in which the guides 18 are formed.

The registration inserts 16a, 16b may further include a tapered portion 50 formed thereon or secured thereto. The tapered portion 50 is typically secured to the cylindrical portion 22 opposite the flange 34. The tapered portion 50 may serve to gradually transition the fibers 14 from being tightly wound within the cable 12a, 12b to being spread apart by the guides 18. In the illustrated embodiment, the tapered portion 50 includes two regions 52, 54 having different degrees of tapering.

Figure 3:
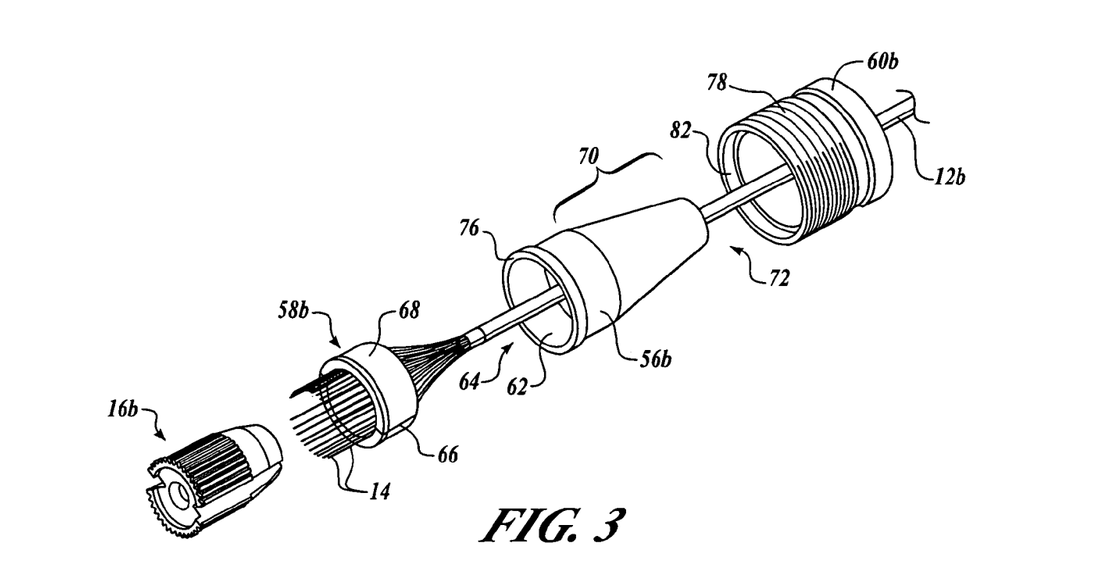
FIG. 3 is an enlarged, exploded view of a right-hand portion of the connector assembly of FIG. 1, in accordance with an embodiment of the present invention.

Referring to FIGS. 1 through 3, a fastening system in accordance with the present invention may serve to retain the fibers 14 within the guides 18, the alignment keys 38 within the alignment receptacles 36, and the coupling faces 24 in engagement. In the illustrated embodiment, the fastening system includes connector covers 56a, 56b, retention rings 58a, 58b, and threaded fasteners (or sleeves) 60a, 60b.

The connector covers 56a, 56b may be sized to envelope a registration insert 16a, 16b leaving the coupling face 24 exposed and retaining the fibers 14 within the guides 18 and the alignment keys 36 within the alignment receptacles 38, as shown in FIGS. 4 through 7. In the illustrated embodiment, the connector covers 56a, 56b include an inner tapered portion 62 near the proximal end 64 thereof that decreases in diameter with distance from the proximal end 64. The tapered portion 62 may engage a tapered outer surface 68 (FIG. 3) of the retention ring 58a, 58b encircling the registration insert 16a, 16b and the fibers 24.

The retention ring 58a, 58b may serve to retain the fibers 14 during assembly and processing of the connector assembly 10. In some embodiments, a slit 66 may be formed in the retention ring 58a, 58b, enabling the retention ring 58a, 58b to elastically deform to fit over the registration insert 16a, 16b and exert a restoring force thereon to retain the fibers 14 within the guides 18 (FIG. 2). As mentioned above, the retention ring 58a, 58b may include the tapered outer surface 68, decreasing in diameter with distance from the flange 34 of the registration inserts 16a, 16b. The tapered outer surface 68 of the retention ring 58a, 58b may engage the tapered portion 62 of the connector covers 56a, 56b, such that forcing the connector covers 56a, 56b over the retention ring 58a, 58b results in increased pressure on the fibers 14. Forcing the connector covers 56a, 56b over the retention ring 58a, 58b may also force the retention ring 58a, 58b toward the flange 34 and effectively urge the fibers 14 toward engagement with the fibers 14 secured to the opposite registration insert 16a, 16b.

As best shown in FIG. 3, the connector covers 56a, 56b may further include a conical section 70 extending from the tapered portion 62 toward a distal end 72 of the connector cover 56a, 56b. The conical section 70 may transition from the relatively wide region necessary to accommodate the registration insert 16a,16b and retention ring 58a, 58b to an opening 74 slightly larger than the optical cables 12a, 12b. The conical section 70 may be sized such that it does not exert significant pressure on the fibers 14 or the tapered portion 50 of the registration insert 16a, 16b. Alternatively, the conical section 70 may engage the tapered portion 50, or fibers 14 to urge the registration insert 16a, 16b toward engagement with the opposite registration insert 16b,16a.

The connector covers 56a, 56b may further include a flange 76 extending radially therefrom. The flange 76 may engage the corresponding fastener 60a, 60b which secures the connector covers 56a, 56b to one another. In the illustrated embodiment, the flanges 76 are formed near the proximal end 64 of the connector covers 56a, 56b. The fastener may be embodied as threaded fasteners 60a, 60b, which secure to one another and capture the flanges 76 of the connector covers 56a, 56b. Various means may be used to secure the fasteners 60a, 60b to one another, including, for example, clips, screws, bolts, clamps, or the like.

In the illustrated embodiment, the fastener 60b includes a threaded outer surface 78 that engages a threaded inner surface 80 formed on the fastener 60b. The fastener 60b further includes a seat 82 that engages the flange 34 of the registration insert 16b. The fastener 60a includes a flange 84 extending radially inwardly therefrom that engages the flange 34 of the registration insert 16a.

Figure 4:
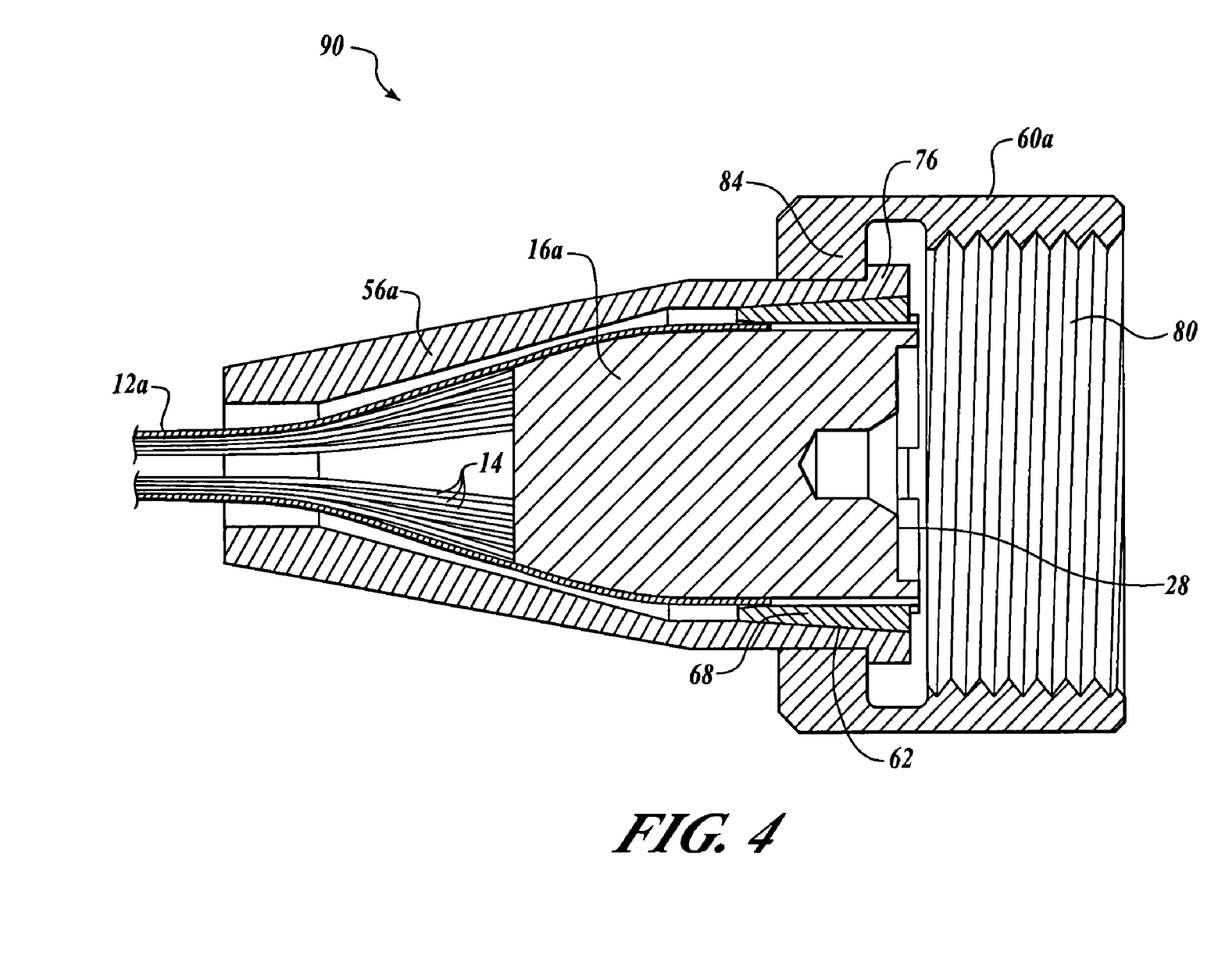
FIG. 4 is an enlarged, side cross-sectional view of a left-hand portion of the optical fiber connector of FIG. 1, in accordance with an embodiment of the present invention.
Figure 5:
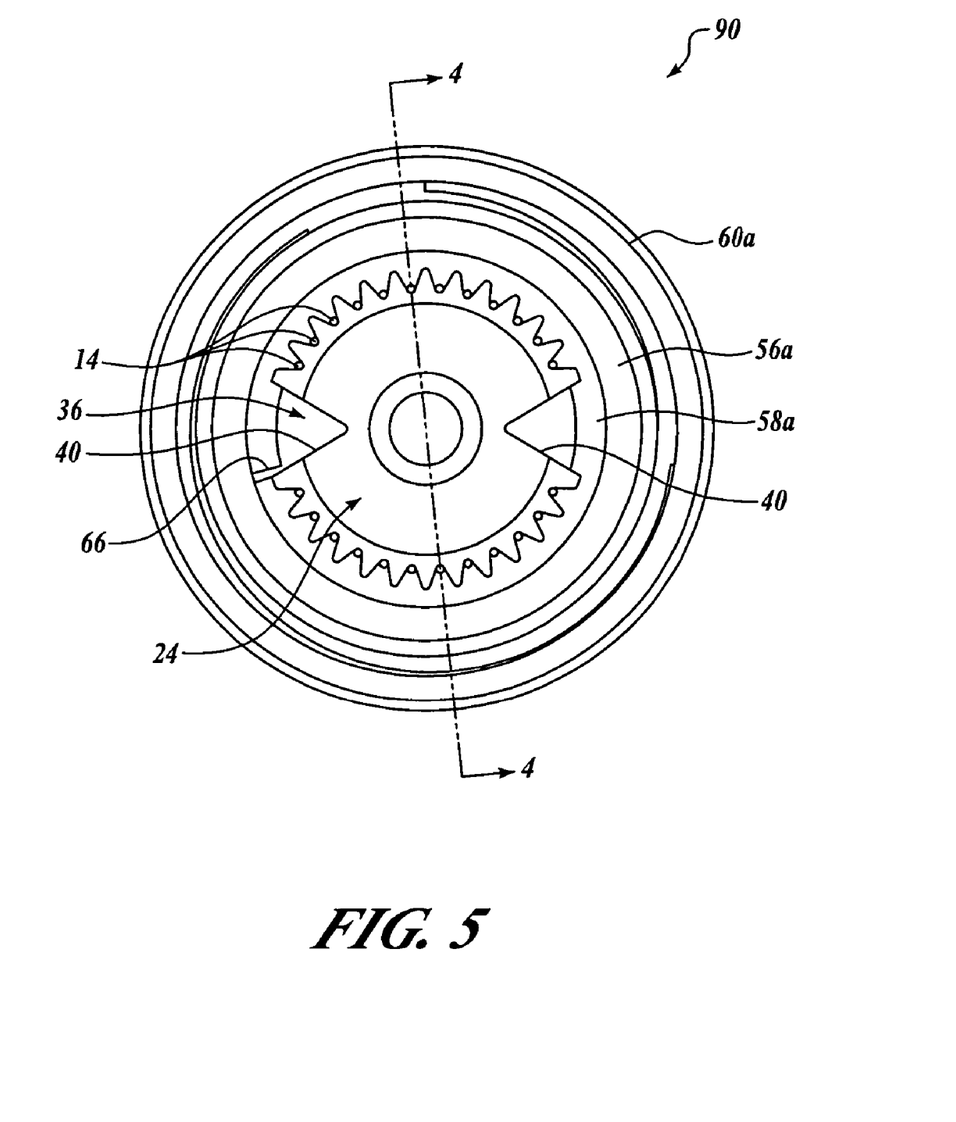
FIG. 5 is a front cross sectional view of the left-hand portion of FIG. 4.
Figure 6:
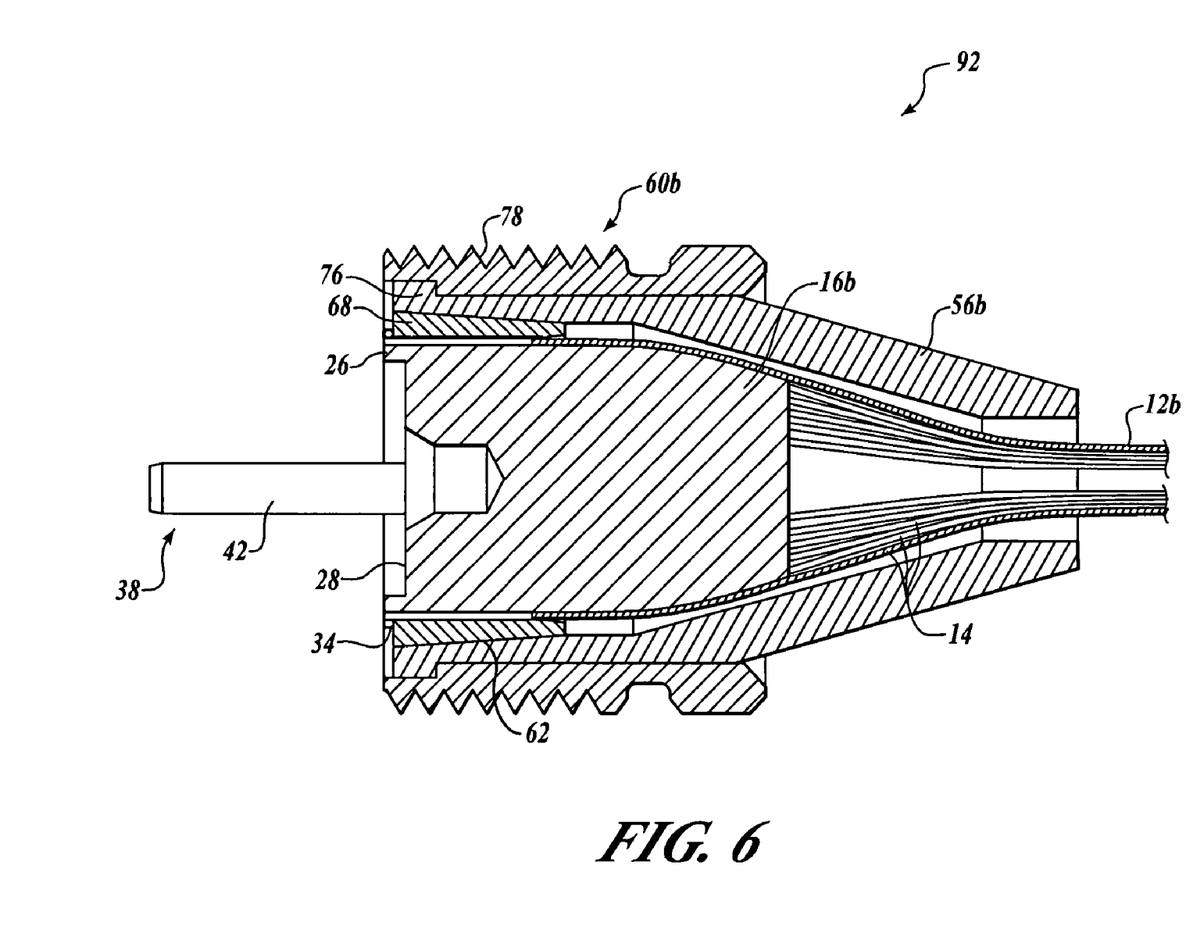
FIG. 6 is an enlarged, side cross-sectional view of the right-hand portion of FIG. 3.
Figure 7:
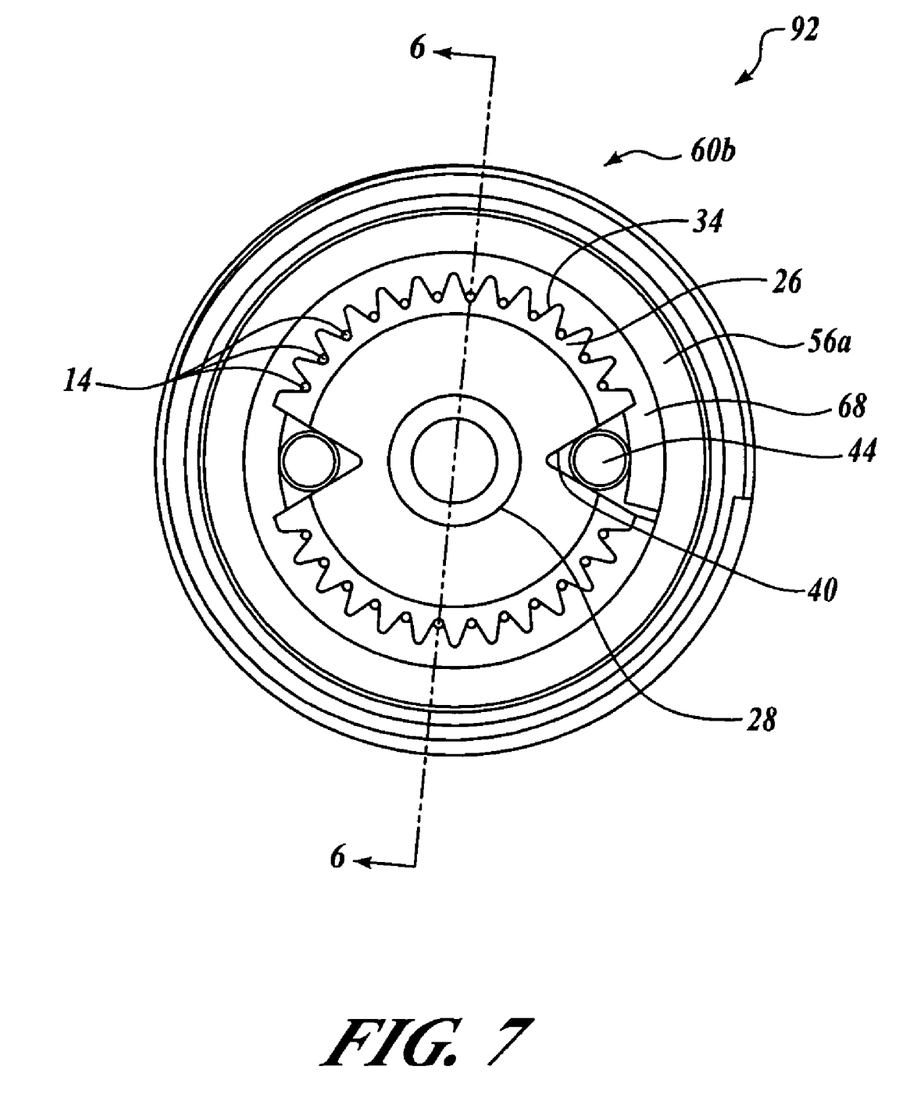
FIG. 7 is a front cross sectional view of the right-hand portion of FIG. 6.

FIGS. 4 and 5 show side and end cross-sectional views, respectively, of a left-hand portion 90 of the optical fiber connector 10 of FIG. 1. Similarly, FIGS. 5 and 6 show side cross-sectional views, respectively, of the right-hand portion 92 of the optical fiber connector 10 of FIG. 1. As shown in FIGS. 4-7, as the fasteners 60a, 60b are threaded together, the seat 82 and the flange 84 draw the connector covers 56a, 56b together to effectively urge the registration inserts 16a, 16b and their corresponding fibers 14 into contact.

Figure 8:
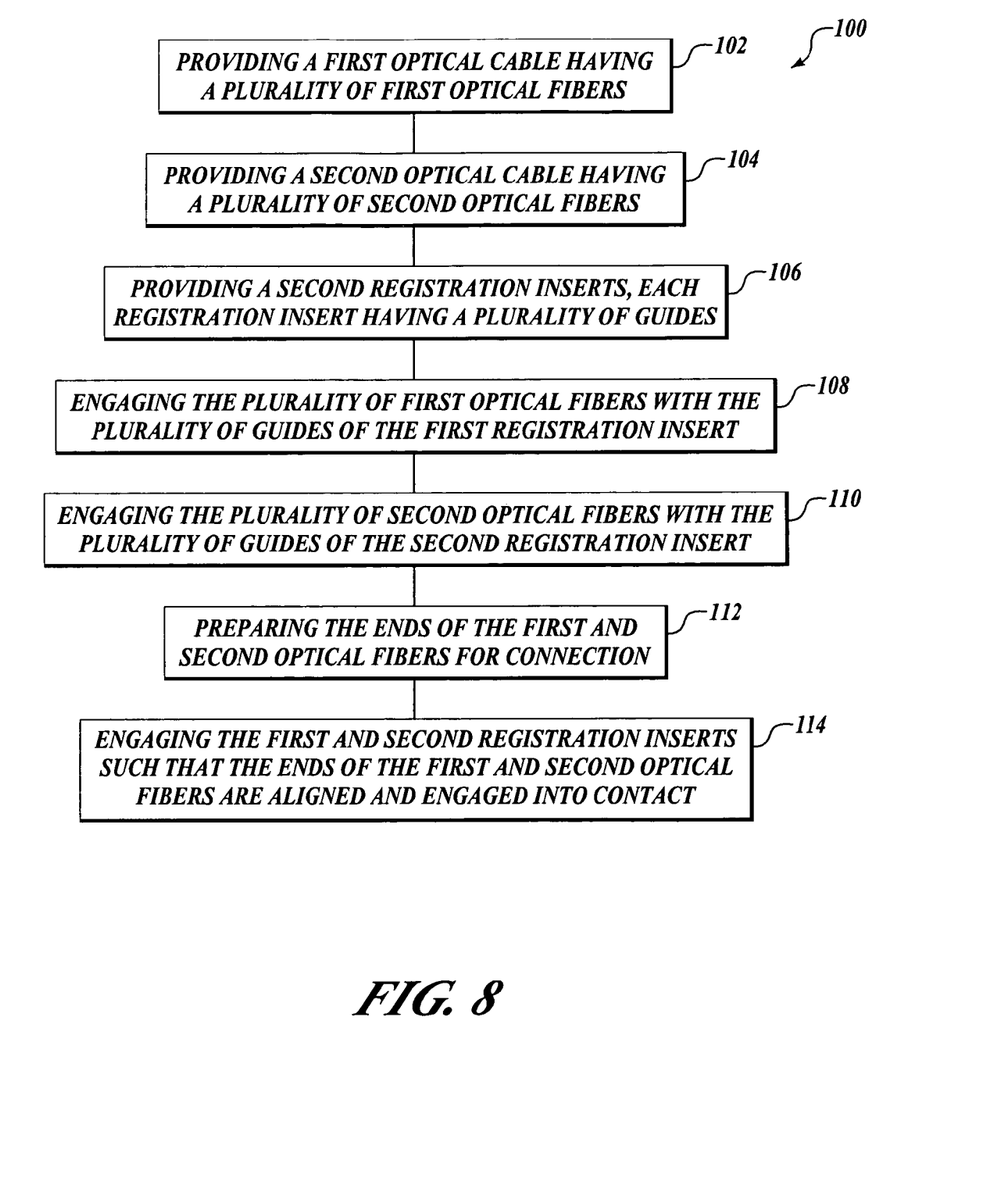
FIG. 8 shows a method of connecting first and second optical cables in accordance with another embodiment of the invention.

FIG. 8 shows a method 100 of connecting first and second optical cables in accordance with an embodiment of the invention. In this embodiment, the method 100 includes providing a first optical cable having a plurality of first optical fibers at a block 102, and providing a second optical cable having a plurality of second optical fibers at a block 104. At a block 106, first and second registration inserts are provided, each registration insert including a plurality of guides formed therein and adapted to receive a corresponding one of the first and second optical fibers, and a coupling face disposed at an end thereof. As described above, the guides may be "V" grooves formed in the outer surface of the registration inserts, and the guides may be approximately perpendicular to the coupling face of each registration insert.

At a block 108, the plurality of first optical fibers are engaged with the plurality of guides of the first registration insert, and at a block 110, the plurality of second optical fibers are engaged with the plurality of guides of the second registration insert. The engagement of the optical fibers with the corresponding guides of the first and second registration inserts may include securing (or fastening) the fibers to the guides, such as by applying the retaining rings 58a, 58b, by applying an adhesive, or in any other suitable fashion. At a block 112, the ends of the first and second optical fibers may be prepared for connection, including, for example, by cutting, polishing, or any other suitable preparatory activity. At a block 114, the first and second registration inserts are engaged such that the ends of the first and second optical fibers are engaged into contact. As described above with respect to FIGS. 1-7, the engagement of the first and second registration inserts may include placing a first retention member over the first registration insert, placing a second retention member over the second registration insert, and fastening the first retention member to the second retention member. The engagement of the first and second registration inserts may further include aligning alignment grooves disposed in the first and second registration inserts, and engaging one or more alignment members into the alignment grooves.

Embodiments of apparatus and methods in accordance with the invention may provide significant advantages over the prior art. Because the first and second optical fibers are engaged with the guides of the first and second registration inserts, and because the guides may be precisely formed within the first and second registration inserts, the engagement of the first and second registration inserts may advantageously provide improved alignment of the ends of the first and second optical fibers. Thus, the ends of the optical fibers may be more precisely aligned and engaged, thereby reducing the attenuation losses normally associated with connections of optical fibers in comparison with the prior art.

It will be appreciated that a variety of alternate embodiments of the invention may be conceived, and that the invention is not limited to the particular embodiments described above and shown in the accompanying figures. For example, although the illustrated registration inserts are approximately round or circular in cross-section, a variety of different shapes of registration inserts may be used, including rectangular shapes, triangular shapes, or any other cross-sectionally shaped members. The guides for the optical fibers may be perpendicular to the coupling faces as shown in the accompanying figures, or may be disposed at suitable angles to the coupling faces as desired. Also, in further embodiments, one or more of the connector covers, retention rings, and threaded fasteners may be combined into a coupling member, and pairs of coupling members may then be used to coupled the registration inserts together. The coupling members may threadedly engage as described above, or in alternate embodiments, the coupling members may be adhesively bonded, may snap or press fit into engagement, or may be coupled by spring clips, clamps, or any other suitable coupling devices.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An apparatus for coupling a plurality of optical fibers, comprising:
 a first registration insert and a second registration insert, each registration insert including
  a body having a coupling surface formed at an end thereof;
  a flange formed flush with the coupling surface, the flange including a plurality of projecting members distributed circumferentially about the body;
  a first alignment key receptacle disposed on the body; and
  a plurality of guides formed on an outer surface of the body, each guide adapted to receive an optical fiber with a terminal portion of the optical fiber positioned proximate the coupling surface;

a first retention member and a second retention member disposed over the first and second registration inserts, respectively, the first and second retention members being coupleable to one another such that the coupling surfaces of the first and second registration inserts are engaged together and the plurality of guides of the first registration insert are approximately aligned with the plurality of guides of the second registration insert.

2. The apparatus of claim 1, wherein the apparatus further comprises a first alignment key at least partially disposed within the first alignment key receptacles of the first and second registration inserts.

3. The apparatus of claim 2, wherein the first and second registration inserts each further comprises a second alignment key receptacle disposed on the body, and wherein the apparatus further comprises a second alignment key at least partially disposed within the second alignment key receptacles of the first and second registration inserts.

4. The apparatus of claim 3, wherein the first and second alignment key receptacles of the first and second registration inserts are symmetrically disposed with respect to one another.

5. The apparatus of claim 2, wherein the first alignment key receptacle of the first and second registration inserts is a groove formed in the first and second registration inserts oriented perpendicular to the coupling surface thereof.

6. The apparatus of claim 5, wherein the groove comprises two walls forming a V in a plane parallel to the coupling surface.

7. The apparatus of claim 6, further comprising first and second retention rings encircling the first and second registration inserts, respectively, the retention rings decreasing in thickness with distance from coupling surface, the first and second retention members further comprising a tapered inner surface adapted to engage the first and second retention rings, respectively.

8. The apparatus of claim 1, wherein each retention ring includes a slit, the slit configured to enable the retention ring to elastically deform over the corresponding registration insert.

9. The apparatus of claim 1, wherein the guides comprise grooves having an approximately "V" cross-sectional shape.

10. The apparatus of claim 1, wherein the guides are disposed symmetrically on the first and second registration inserts.

11. The apparatus of claim 1, further comprising a fastener including:
an outer sleeve having a threaded inner surface and a first ridge extending inwardly at a distal end thereof;
an inner sleeve having a threaded outer surface and a second ridge extending inwardly at a proximal end thereof;
and wherein the first and second retention members each further include a stop ridge extending outwardly and adapted to engage the first ridge of the outer sleeve and the second ridge of the inner sleeve, respectively.

12. An apparatus for coupling optical fibers, comprising:
first and second registration inserts, each registration insert including
a coupling surface;
a flange formed flush with the coupling surface, the flange including a plurality of projecting members distributed circumferentially about the body;
a first alignment groove and a second alignment groove disposed on the body; and
a plurality of linear grooves oriented perpendicular to the coupling surface, and each linear groove having two walls forming a V in a plane parallel to the coupling surface;
first and second retention sleeves disposed over the first and second registration inserts, respectively, the first and second retention sleeves being fastened to one another such that the coupling surfaces of the first and second registration inserts are engaged and the plurality of linear grooves of the first registration insert are approximately aligned with the plurality of linear grooves of the second registration insert.

13. The apparatus of claim 12, further comprising a first alignment key, and a second alignment key the first alignment key disposed within the first alignment grooves of the first and second registration inserts and the second alignment key disposed within the second alignment grooves of the first and second registration inserts.

14. The apparatus of claim 13, wherein the first and second alignment grooves of the first and second registration inserts are oriented perpendicular to the coupling surface thereof.

15. The apparatus of claim 13, wherein the first and second alignment grooves each comprise two walls forming a V in a plane parallel to the coupling surface.

16. A method for connecting optical fibers, comprising:
providing a first and a second registration insert, each registration insert including
a body having a coupling face;
a flange formed flush with the coupling surface, the flange including a plurality of projecting members distributed circumferentially about the body;
an alignment groove disposed on the body; and
a plurality of guides formed on an outer surface of the body and extending approximately away from the coupling face, each guide being adapted to receive a corresponding one of the optical fibers;
engaging a first plurality of optical fibers into the plurality of guides of the first registration insert;
engaging a second plurality of optical fibers into the plurality of guides of the second registration insert; and
coupling the first and second registration inserts such that the coupling face of the first registration insert engages the coupling face of the second registration insert and the first plurality of optical fibers are aligned with the second plurality of optical fibers.

17. The method of claim 16, wherein engaging a first plurality of optical fibers into the plurality of guides of the first registration insert includes fastening the first plurality of optical fibers to the plurality of guides of the first registration insert.

18. The method of claim 16, wherein coupling the first and second registration inserts includes placing a first retention sleeve over the first registration insert, placing a second retention sleeve over the second registration insert, and fastening the first retention sleeve to the second retention sleeve.

19. The method of claim 16, wherein coupling the first and second registration inserts includes coupling the first and second registration inserts such that the first plurality of optical fibers are in contact with the second plurality of optical fibers.

20. The method of claim 16, wherein coupling the first and second registration inserts includes aligning the alignment groove of the first registration insert with the alignment groove of the second registration insert and engaging the alignment grooves with an alignment member.

* * * * *